US009940557B2

(12) United States Patent
Chapman et al.

(10) Patent No.: US 9,940,557 B2
(45) Date of Patent: Apr. 10, 2018

(54) DOCUMENT PRINTING USING HARDWARE-DEPENDENT FONTS

(71) Applicant: Xerox Corporation, Norwalk, CT (US)

(72) Inventors: Edward N. Chapman, Rochester, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 262 days.

(21) Appl. No.: 15/017,705

(22) Filed: Feb. 8, 2016

(65) Prior Publication Data

US 2017/0228620 A1   Aug. 10, 2017

(51) Int. Cl.
*G06K 15/02* (2006.01)
*H04N 1/23* (2006.01)
*H04N 1/40* (2006.01)

(52) U.S. Cl.
CPC ..... *G06K 15/1843* (2013.01); *G06K 15/1802* (2013.01); *H04N 1/2315* (2013.01); *H04N 1/40062* (2013.01); *H04N 2201/0094* (2013.01)

(58) Field of Classification Search
None
See application file for complete search history.

(56) References Cited

U.S. PATENT DOCUMENTS

| 4,661,916 A | 4/1987 | Baker et al. |
| 7,408,556 B2 | 8/2008 | Brown |
| 7,580,153 B2 | 8/2009 | Eschbach et al. |
| 8,244,070 B2 * | 8/2012 | Chapman ............... G06T 11/60 382/293 |
| 8,355,167 B2 | 1/2013 | Chapman et al. |
| 2004/0225773 A1 | 11/2004 | Wang et al. |

OTHER PUBLICATIONS

Klawonn, Frank. "Introduction to Computer Graphics: Using Java 2D and 3D", Jan. 18, 2012. Springer Science & Business Media, pp. 85-87.*

* cited by examiner

*Primary Examiner* — John Wallace
(74) *Attorney, Agent, or Firm* — Fox Rothschild LLP (57) ABSTRACT

A system prints a document by generating a device-dependent font that is appropriate for the document and the print device. The system does this by identifying a font for the document, identifying an affine transformation matrix for the font, using the device resolution and current page location of the print device to modify the affine transformation matrix to yield a current transformation matrix, adding a reverse of the current transformation matrix to the affine transformation matrix to yield a modified font matrix, and generate a print file using the modified font matrix. The print device then uses the print file print the document with a font corresponding to the modified font matrix.

19 Claims, 7 Drawing Sheets

|     | X   | r1 | r2 | Y | XΔ | YΔ |
| --- | --- | -- | -- | - | -- | -- |
| 501 | 1   | 0  | 0  | 1 | 0  | 0  |
| 502 | 3   | 0  | 0  | 1 | 0  | 72 |
| 503 | 1/3 | 0  | 0  | 0 | 0  | -72 |
| 504 | 1   | 0  | 0  | 1 | 0  | 0  |

DOCUMENT PRINTING USING HARDWARE-DEPENDENT FONTS

BACKGROUND

When generating an electronic document that will be printed by a print device, one or more fonts may be specified so that the print device knows what typeface, size, spacing and pitch to apply to the various characters of the document. A font is a set of rules and/or parameters that document presentation hardware such as a print device or display device will use to identify the typeface of the characters to be printed or displayed. Example qualities that a font may associate with a typeface include size, style (such as bold, italic, or normal), weight, spacing between characters, and pitch.

Most fonts are designed to be scalable and work at a wide range of sizes so that characters that use the font can be placed anywhere on a page in any combination and/or size. On the other hand, certain specialized fonts such as microtext, Xerox GlossMark® fonts and Correlation Mark fonts are designed to work at exactly one size based on pixel width and height. In addition, many specialized fonts must be placed in an exact pixel position on a page and be rotated only 0, 90, 180 or 270 degrees if the resolution is square (e.g., 600×600 dots per inch (dpi)), or only 0 or 180 degrees if the resolution is not square (e.g., 600×390 dpi). If one particular font works at a height of 240 pixels (which equals 28.8 points on a 600×600 dpi device) it will fail at other sizes.

Figure 1:
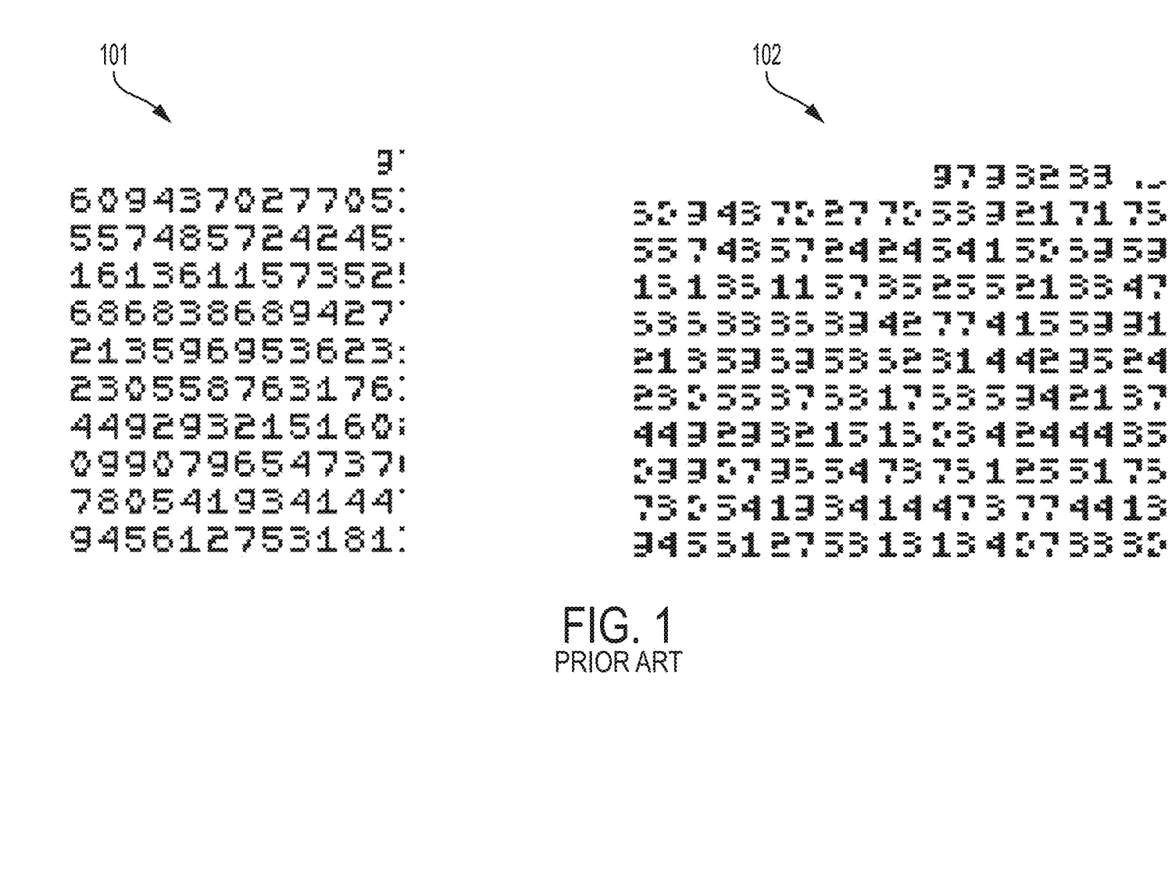
FIG. 1 illustrates an example problem that can occur in the prior art when applying a specialized font to devices having different settings.

An example of this is shown in FIG. 1, in which a portion of a document 101 is printed by a print device with a speed setting of 325 and a resolution is 600×600 dpi. In this example, the microtext as printed is under one point in size (where one point=1/72 inch), although it has been zoomed in FIG. 1 for purpose of illustration. Document portion 102 has been printed after the print device's speed setting was changed to 500, and the resolution was changed to 390×600 dpi. The same microtext font was used in document 101 and document 102, but the change to the print device's speed and resolution caused the font to no longer correctly work in document 102. Some of the glyphs in document 102 (such as the numbers "4" and "1" are still discernible, but others (such as "6", "0" and "9" have been altered so that they are no longer recognizable.

Figure 2:
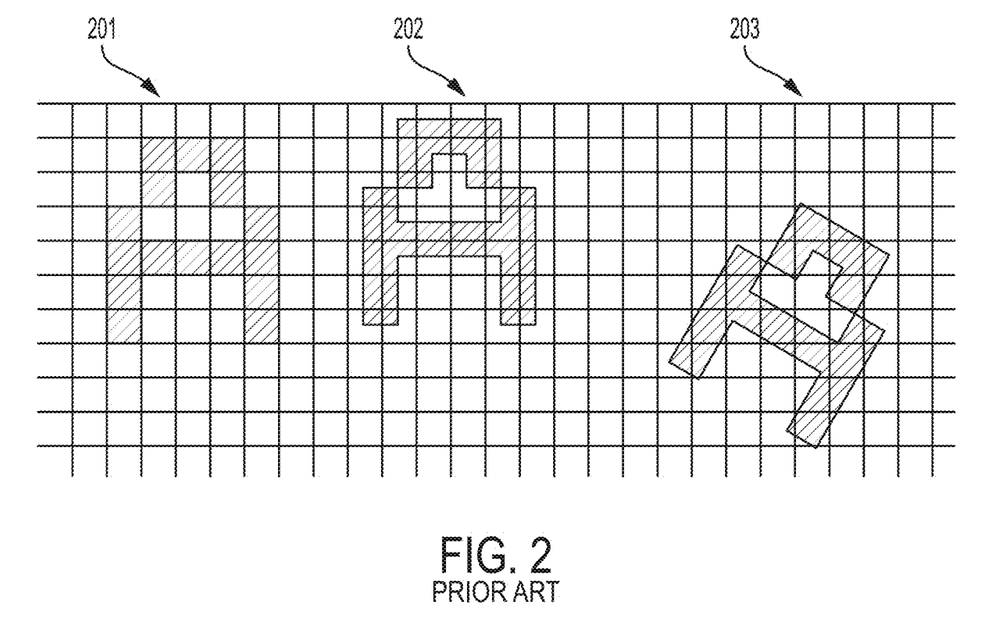
FIG. 2 illustrates another example problem that can occur in the prior art, in this example misalignment.

In addition, when specialized fonts are used, if the pixels of the glyphs are not placed in precisely the correct location on the page, misalignment can occur. For example, FIG. 2 shows a matrix of squares, each of which represents a pixel that can be either filled or empty. The first glyph 201 ("A") is correctly pixel aligned. The second version of the same glyph 202 is misaligned ½ pixel in both the X and Y directions, and individual pixels may be written in the incorrect position. The third version 203 shows that rotations other than 0, 90, 180 and 270 degrees do not work in this font as the pixels are no longer completely filled or completely empty, as with the glyphs in the correctly aligned version 201.

Thus, when specialized fonts are used across different print devices, a device-specific specialized font must be created for and/or assigned to the device. Alternatively, a complex transformation must be applied to transform a specialized font to the particular hardware that will be used to print the document. This adds complexity in creating and tracking different fonts and files for different devices having multiple resolutions.

This document describes devices and methods that are intended to address issues discussed above and/or other issues.

SUMMARY

In an embodiment, a processor and print device may print a document using a hardware dependent font. The processor may receive an electronic document file and identify one or more fonts for the document, as well as a print device that will be used to print the document. The processor will identify an affine transformation matrix for the font. The processor will also query a print system to return a device resolution and a current page location for the print device. The processor will receive the device resolution and the current page location from the print system, and it will use the device resolution and current page location to yield a current transformation matrix. The processor will add an inverse of the current transformation matrix to the affine transformation matrix to yield a modified font matrix and generate a print file for a document using the modified font matrix. The print file will, when received by the print device, cause the print device to print the document with a font corresponding to the modified font matrix. The processor will also transmit the print file to the print device. The system also may include the print device that can receive the print file and use the print file to print the document on a substrate.

Optionally, before identifying the affine transformation matrix for the font, as noted above the system may receive an electronic document file corresponding to the document. The system may extract the font from the electronic document file; identify the print device as a print device that will be used to print the document; and determine whether the font is suitable for the print system. Optionally, when identifying the affine transformation matrix the system may do so in response to determining that the font is not suitable for the print system. To determine whether the font is suitable for the print system, then system may determine whether, when printed by the print device, glyphs of the font will primarily partially fill pixels of the document.

Optionally, when querying the print system to return the device resolution and the current page location, the system may retrieve a rotation and X-Y coordinates of a position of a page in the print system. In this embodiment, when identifying the affine transformation matrix the system may include the rotation and the X-Y coordinates of the position in the affine transformation matrix.

Optionally, when querying the print system to return the device resolution and the current page location, the system may query a digital front end of the print system to return the current page location, and it may query a print engine of the print system to return the device resolution.

In another embodiment, a document printing system includes a print system that includes a print device and a digital front end; a processing device; and a non-transitory, computer-readable memory. The memory includes programming instructions that are configured to cause the processing device to: identify an affine transformation matrix for a font; query the digital front end to return a current page location; query the print device to return a device resolution for the print device; receive the device resolution and the current page location; use the device resolution and current page location to yield a current transformation matrix; add an inverse of the current transformation matrix to the affine transformation matrix to yield a modified font matrix; generate a print file for a document using the modified font matrix; an cause the print device to print the document on a substrate with a font corresponding to the modified font matrix.

BRIEF DESCRIPTION OF THE DRAWINGS

FIG. 6 illustrates a comparison of the problems of the prior art with an application of the current systems to a specialized font.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

In this document, the term "electronic device" refers to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device that serves as a user interface, as well as a camera or other image capturing device. An electronic device also may include one or more communication hardware components such as a transmitter and/or receiver that will enable the device to send and/or receive signals to and/or from other devices, whether via a communications network or via near-field or short-range communication protocols.

The terms "memory," "memory device," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

A "print device" or "print engine" is a device that is configured to print a document based on digital data, or a multi-functional device in which one of the functions is printing based on digital data. Example components of a print device include a print head, which may include components such as a print cartridge containing ink, toner or another print material, as well as a document feeding system configured to pass a substrate through the print device so that the print head can print characters and/or images on the substrate.

A "print system" is a system of hardware components that include a print device and other components. For example, a printing system may include a marking engine (i.e., the print hardware or print engine) and a digital front end. A digital front end (DFE) is an integrated print workflow management system, including one or more processing devices, capable of receiving and processing print requests and controlling the operation of a print engine to fulfill the print request. The DFE and print engine may be part of a single device (such as a digital printing press), or separate parts of a system of networked devices.

A "processor" or "processing device" is a hardware component of an electronic device that is configured to execute programming instructions. The term "processor" may refer to either a single processor or to multiple processors that together implement various steps of a process. Unless the context specifically states that a single processor is required or that multiple processors are required, the term "processor" includes both the singular and plural embodiments.

This document describes a system by which a processor of an electronic device will generate a device dependent font when causing a print device to print a document. A font is typically stored in a memory and accessed by the processor when generating the commands to print the document. In this system, the processor will adjust various characteristics of an available font, optionally on a per page basis. In this way, a single specialty font can be applied to multiple print devices, regardless of the resolution, feed orientation, or other characteristics of the print device.

The present disclosure in various embodiments relates generally to a electronically stored, visible when rendered, data font. In the design of the font, characters, symbols and other font elements may be recognizable predominantly by characteristics other than standard graylevel or color difference as is common in prior art fonts, e.g. black text on white background, yellow text on blue background, etc. Rather, the font elements are recognizable by changes in the halftone structure of a field, where the halftone structure is modulated by either orientation, position, or both. For example, this disclosure can address a differential gloss halftone font or other correlation font. Thus, when this document uses the term "font", it is intended to refer to a font that has a pixel-by-pixel rendering attribute, such as microtext or another very small font.

Figure 3:
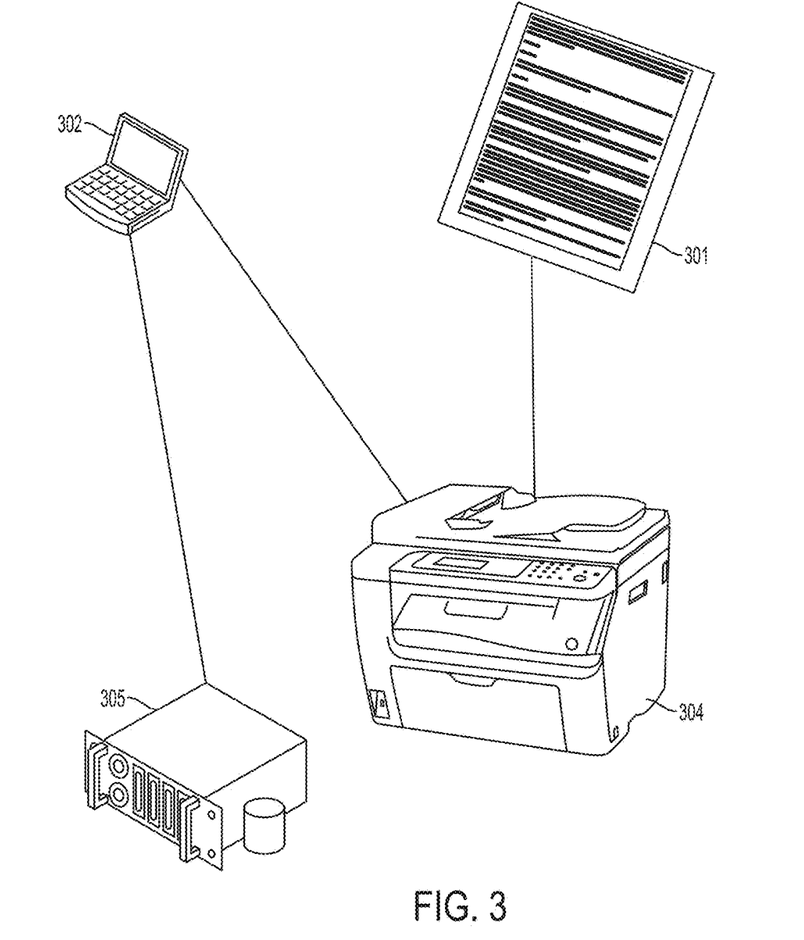
FIG. 3 depicts example components of a system for creating a device-dependent font and printing a document using the font.

FIG. 3 illustrates an example of a system for generating a printed document 301 using an electronic device 302 and print device 303. The electronic device 302 may be a component, or include one or more components, of the print device 304, or they may be separate devices as shown. The electronic device generates a print file that it sends to the print device 304. The electronic device 302 will retrieve a font from a memory 305, which is optionally part of the electronic device 302 or optionally external to the electronic device (as shown) and accessible by one or more communication networks. In some embodiment, the font may be a specialty font that is specific to a particular print device or type of print device and that is not, by itself without transformation, scalable across a wide variety of print devices. The electronic device 302 will use a modified version of the font to generate the print file, and the print device 304 will use instructions and parameters in the print file to determine how to print the document 301.

Figure 4:
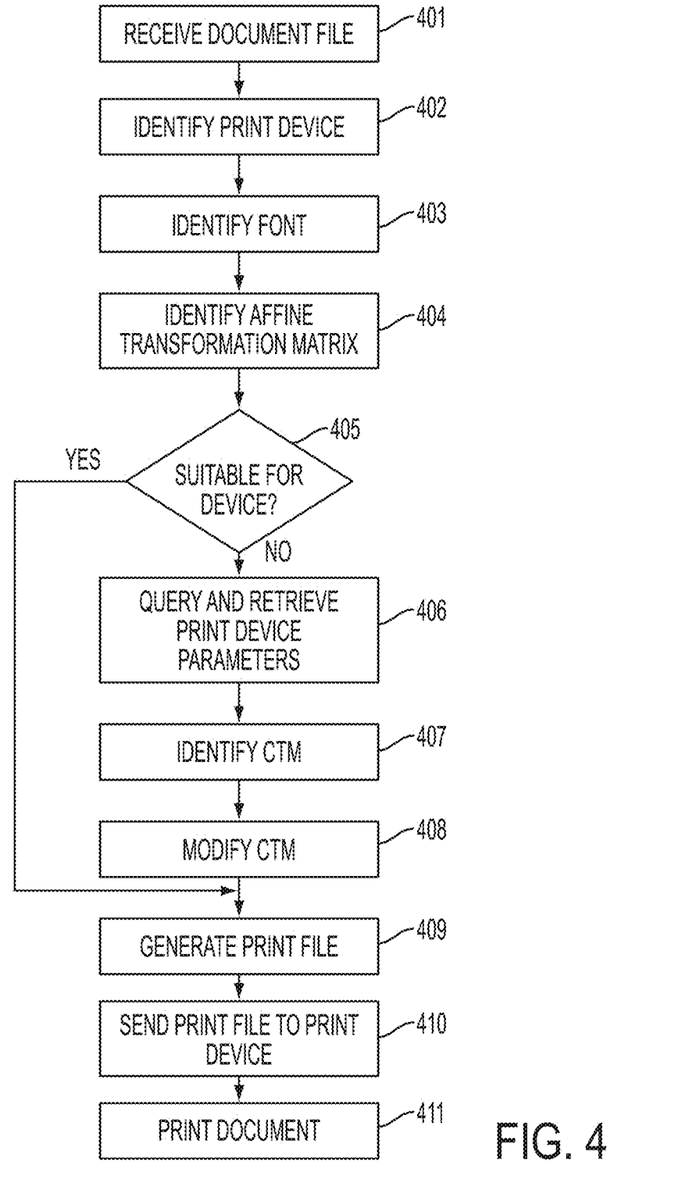
FIG. 4 illustrates various steps that may occur when generating a device-dependent font and using the font to print a document.

When using the font to generate the print file, the electronic device will create a new font that is appropriate to the print device. FIG. 4 illustrates a process for generating a device-dependent font and using the font to cause a print device to print a document using the device-dependent font. First, an electronic device will receive an electronic document file (step 401). In one embodiment, the electronic document file may be received from an external source, such as by email, file transfer or another communications protocol. Alternatively, the electronic device may receive the electronic document file by generating it based on user input through a document generation application such as a word processor, publisher, web browser or other document generation application.

The electronic device will also identify a print device that will be used to print the document (step 402). The electronic device may do this based on a default print device that is assigned to the electronic device or the applicable document generation application. Alternatively, the electronic device may receive a print device selection by presenting a user with a menu of available print devices and receiving the user's selection of one of the print devices via a user interface.

The system may identify one or more fonts for the document (step 403). The fonts may be included in the electronic document file and established based on user selection, application defaults, electronic device defaults, or other instructions. The font will be associated with an affine transformation matrix. A single font may apply to the entire document, or any of multiple fonts may apply to different portions of the document. Thus, the system may analyze the electronic document file and extract metadata or other instructions indicating each area in the document at which a particular font will be applied, such as a starting and/or stopping point for the use of each font. For each font, the system may determine whether the font that is suitable for the print device (step 404). A font will be suitable for the print device if it is either (a) scalable and non-specialized without requirement for any complex transformation, or (b) designed for a print device having the settings of the identified device so that when glyphs are printed they will either completely fill or completely avoid each pixel.

If the font is suitable for the print device, then the system will use that font when generating the print file for the document (step 409). However, at any point in the document that requires a font that determined to be not suitable for the print device (in step 405), the system will generate a modified font that is suitable for the print device. Rather than simply scaling the font, the system will transform the font to a modified font by identifying a transformation matrix that will ensure that each pixel of each glyph will, when printed by the print device, completely fill (or completely avoid) a pixel, and thus be of the required size and place to print a legible document. If, when printed by the print device, glyphs of the font will primarily partially fill pixels of the document, then the font will not be suitable for the print device and will be a candidate for transformation using the processes described in this document.

To determine the transformation matrix for the font that will ensure legibility, the system may identify an existing affine transformation matrix for the font (step 404) and query applicable print hardware, such as the print device or a component of a print system that includes the print device so that the print device or system returns certain parameters (step 406). For example, a print system may include a DFE and a marking engine. The system may query the print system's DFE to retrieve the print device's current page location (i.e., a position on the page the printer is currently located and ready to print), a scale, and a measurement of rotation, and either retrieve or use that information to develop a current transformation matrix (CTM) for the print device (step 407). The system may query the print system's marking engine to retrieve the marking engine's resolution (or possible resolutions). The resolution(s) may be that which the print components of the print system are capable of printing, measured in units such as in horizontal×vertical dots per inch (dpi). The system may then apply an inverse of the CTM to the affine transformation matrix for the font to yield a modified font matrix (step 408), which the system will then use to print text with the font on a substrate.

Figure 5:
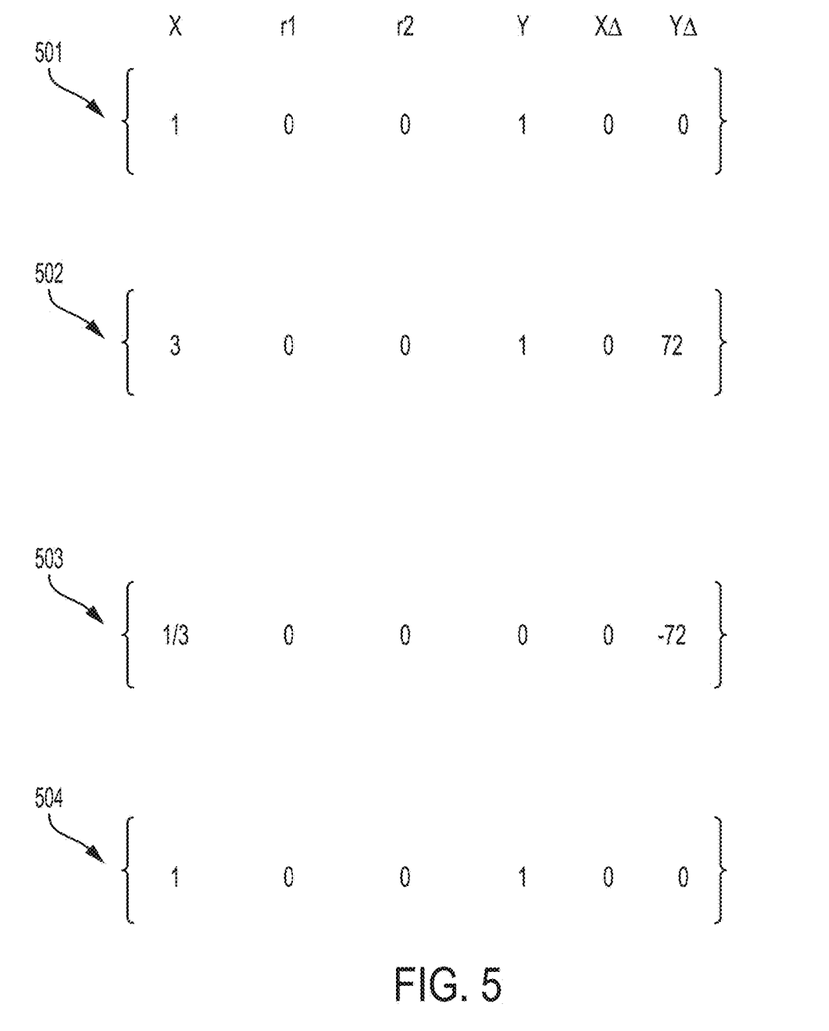
FIG. 5 illustrates examples of various font matrices.

By way of example with reference to FIG. 5, consider a unity matrix which may apply to all print systems 501, representing a starting position of the print engine at an X=1, Y=1 position, with no rotation. The system will query the print system to return a current transformation matrix (CTM) for any given location in the document, which can be used in the affine transform scaling x and y, position x and y, and rotation once per glyph. FIG. 5 shows an example of a CTM 502 which changes the x-scaling by a factor of 3 points and the y-scaling by 72 points. After used for any glyph, the system may generate a new CTM for a next glyph. The system will then apply an inverse of the CTM (see, e.g., 503) to the affine transformation matrix for the font to yield a modified font matrix (see, e.g., 504). The modified font matrix shown is generated for a print device having a same resolution as that expected for the CTM. If the print device will have a different resolution (e.g., 500×500 dpi instead of an expected 600×600 dpi), then the matrix may be [600/500, 0, 0, 600/500, 0, 0] to scale 600/500 in both the x and y directions.

The modified font matrix will contain commands to get the print system's page location and resolution for the current page, and to scale the font to print the exact width and height in pixels instead of size. If the print device has a single resolution, this resolution may be encoded in the device. If a device has multiple possible resolutions, the possible resolutions also may be encoded in the DFE, or the DFE may communicate with the marking engine to return a current resolution for the page and/or glyph location. The font matrix also may contain commands to obtain the CTM and translate, rotate or scale the font to an appropriate width and height (as measured in pixels) and rotate by 0, 90, 180 or 270 degrees.

Returning to FIG. 4, once each modified font matrix is produced, the system will generate a print file (step 407) for the document using the modified font matrix (or matrices) so that the print file will, when received by the print device, cause the print device to print the document with a font corresponding to each modified font matrix. The electronic device may save the print file to a memory and/or transmit the print file to the print device (step 408) so that the print device will use the print file to print the document on a substrate (step 409).

FIG. 6 illustrates an example comparing a document portion 102 (previously shown in FIG. 1) in which a 600×600 dpi font was improperly scaled on a print device having a 390×600 dpi resolution. In example 601, the 600×600 dpi font has been printed on a 390×600 dpi device after an affine transformation has been applied in accordance with the principles of this disclosure.

Thus, the modified font may or may not retain (or substantially maintain) the overall appearance of the original font. However, the modified font will retain (or substantially retain) one or more effects of the original font. Such effects may include, for example, security features such as those that exist in microtext marks, correlation marks, marks printed with GlossMark® technology and the like.

Figure 7:
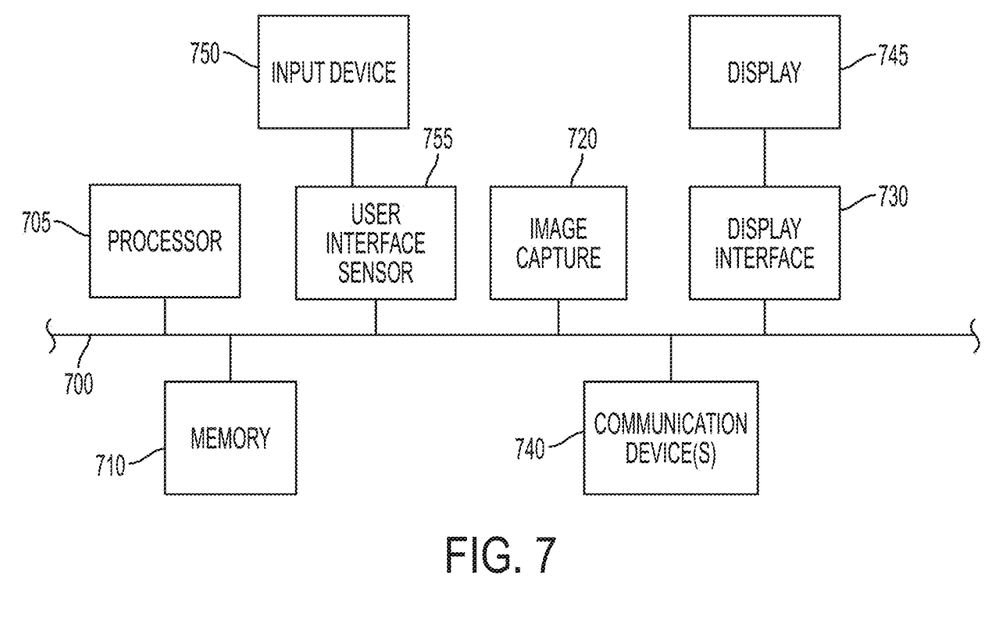
FIG. 7 depicts various embodiments of one or more electronic device for implementing the various methods and processes described herein.

FIG. 7 depicts an example of internal hardware that may be included in any of the electronic components of the system, such as the electronic device, a remote server (such as a server that contains the memory 105 of FIG. 1), or even the print device. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 710. A memory device may include a single device or a collection of devices across which data and/or instructions are stored.

An optional display interface 730 may permit information from the bus 700 to be displayed on a display device 745 in visual, graphic or alphanumeric format. An audio interface and audio output (such as a speaker) also may be provided. Communication with external devices may occur using various communication devices 740 such as a transmitter, transceiver, antenna, communications port or a similar device. A communication device 740 may be attached to a communications network, such as the Internet, a local area network or a cellular telephone data network.

The hardware may also include a user interface sensor 755 that allows for receipt of data from input devices 750 such as a keyboard, a mouse, a joystick, a touchscreen, a remote control, a pointing device, a video input device and/or an audio input device. Data also may be received from an image capturing device 720, such of that a scanner or camera.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of printing a document using a device dependent font, the method comprising:
by a processor, implementing programming instructions that cause the processor to:
identify an affine transformation matrix for a font;
query a print system to return a device resolution and a current page location for a print device of the print system;
receive, from the print system, the device resolution and the current page location;
use the device resolution and current page location to yield a current transformation matrix;
add an inverse of the current transformation matrix to the affine transformation matrix to yield a modified font matrix;
generate a print file for a document using the modified font matrix so that the print file will, when received by the print system, cause the print system to print the document with a font corresponding to the modified font matrix; and
transmit the print file to the print device.

2. The method of claim 1, further comprising, by the print device:
receiving the print file; and
using the print file to print the document on a substrate.

3. The method of claim 1, further comprising, by the processor, before identifying the affine transformation matrix for the font:
receiving an electronic document file corresponding to the document;
extracting the font from the electronic document file;
identifying the print device as a print device that will be used to print the document; and
determining whether the font is suitable for the print system;
wherein identifying the affine transformation matrix is done in response to determining that the font is not suitable for the print system.

4. The method of claim 3, wherein determining whether the font is suitable for the print system comprises determining that the font is not suitable for the print system if, when printed by the print device, glyphs of the font will primarily partially fill pixels of the document.

5. The method of claim 1, wherein querying the print system to return the device resolution and the current page location comprises retrieving a rotation and X-Y coordinates of a position of a page in the print system.

6. The method of claim 5, wherein identifying the affine transformation matrix comprises including the rotation and the X-Y coordinates of the position in the current transformation matrix.

7. The method of claim 1, wherein querying the print system to return the device resolution and the current page location comprises:
querying a digital front end of the print system to return the current page location; and
querying a print engine of the print system to return the device resolution.

8. A document printing system, comprising:
a processing device; and
a non-transitory, computer-readable memory containing programming instructions that are configured to cause the processing device to:
identify an affine transformation matrix for a font,
query a print system to return a device resolution and a current page location for a print device of the print system,
receive, from the print system, the device resolution and the current page location,
use the device resolution and current page location to yield a current transformation matrix,
add an inverse of the current transformation matrix to the affine transformation matrix to yield a modified font matrix,
generate a print file for a document using the modified font matrix so that the print file will, when received by the print system, cause the print system to print the document with a font corresponding to the modified font matrix, and
transmit the print file to the print device.

9. The system of claim 8, further comprising:
the print device; and
additional programming instructions that are configured to cause the print device to:
receive the print file; and
use the print file to print the document on a substrate.

10. The system of claim 8, further comprising additional programming instructions configured to cause the processor, before identifying the affine transformation matrix for the font, to:
receive an electronic document file corresponding to the document;
extract the font from the electronic document file;
identify the print device as a print device that will be used to print the document; and
determine whether the font is suitable for the print system;
wherein identifying the affine transformation matrix is done in response to determining that the font is not suitable for the print system.

11. The system of claim 10, wherein the instructions to determine whether the font is suitable for the print system comprise instructions to determine that the font is not suitable for the print system if, when printed by the print device, glyphs of the font will primarily partially fill pixels of the document.

12. The system of claim 8, wherein the instructions to query the print system to return the device resolution and the current page location comprise instructions to retrieve a rotation and X-Y coordinates of a position of a page in the print system.

13. The system of claim 12, wherein the instructions to identify the affine transformation matrix comprise instructions to include the rotation and the X-Y coordinates of the position in the current transformation matrix.

14. The system of claim 8, wherein the instructions to query the print system to return the device resolution and the current page location comprise instructions to:
query a digital front end of the print system to return the current page location; and
query a print engine of the print system to return the device resolution.

15. A document printing system, comprising:
a print system comprising a print device and a digital front end;
a processing device; and
a non-transitory, computer-readable memory containing programming instructions that are configured to cause the processing device to:
identify an affine transformation matrix for a font,
query the digital front end to return a current page location,
query the print device to return a device resolution for the print device,
receive the device resolution and the current page location,
use the device resolution and current page location to yield a current transformation matrix,
add an inverse of the current transformation matrix to the affine transformation matrix to yield a modified font matrix,
generate a print file for a document using the modified font matrix, and
cause the print device to print the document on a substrate with a font corresponding to the modified font matrix.

16. The system of claim 15, further comprising additional programming instructions configured to cause the processor, before identifying the affine transformation matrix for the font, to:
receive an electronic document file corresponding to the document;
extract the font from the electronic document file;
determine whether the font is suitable for the print device;
wherein identifying the affine transformation matrix is done in response to determining that the font is not suitable for the print device.

17. The system of claim 16, wherein the instructions to determine whether the font is suitable for the print device comprise instructions to determine that the font is not suitable for the print device if, when printed by the print device, glyphs of the font will primarily partially fill pixels of the document.

18. The system of claim 15, wherein the instructions to query the print device to return the device resolution and the current page location comprise instructions to retrieve a rotation and X-Y coordinates of a position of a page in the print device.

19. The system of claim 15, wherein the instructions to identify the affine transformation matrix comprise instructions to include the rotation and the X-Y coordinates of the position in the affine transformation matrix.

* * * * *